US012473192B1

(12) United States Patent
Le

(10) Patent No.: US 12,473,192 B1
(45) Date of Patent: Nov. 18, 2025

(54) ANTI-SIPHONAGE AND ANTI-OVERFLOW FUEL PUMP STRUCTURE

(71) Applicant: Zhongshan Yulite Technology Co., LTD, Zhongshan (CN)

(72) Inventor: Junmin Le, Ningbo (CN)

(73) Assignee: Zhongshan Yulite Technology Co., LTD, Zhongshan (CN)

( * ) Notice: Subject to any disclaimer, the term of this patent is extended or adjusted under 35 U.S.C. 154(b) by 0 days.

(21) Appl. No.: 19/317,264

(22) Filed: Sep. 3, 2025

(51) Int. Cl.
*B67D 7/32* (2010.01)
*B67D 7/62* (2010.01)

(52) U.S. Cl.
CPC ............. *B67D 7/3209* (2013.01); *B67D 7/62* (2013.01)

(58) Field of Classification Search
CPC .......... B67D 7/06; B67D 7/32; B67D 7/3209; B67D 7/58; B67D 7/62; F02M 37/14; F02M 37/04; F02M 59/44
See application file for complete search history.

(56) References Cited

U.S. PATENT DOCUMENTS 4,718,385 A * 1/1988 Konrath ............... F02M 41/126 123/503
7,069,913 B1 * 7/2006 Crary ................... F02M 37/106 123/514
10,662,911 B1 * 5/2020 Martin ................... F02M 37/10
11,268,503 B2 * 3/2022 Byrski ...................... F04F 5/10
11,408,383 B2 * 8/2022 Fisch ..................... F02M 37/12
12,304,803 B1 * 5/2025 Lee .......................... B67D 7/04
2004/0055581 A1 * 3/2004 Okazono .............. F02M 37/103 123/509
2005/0252573 A1 * 11/2005 Montani .................. B67D 7/04 141/98
2008/0035120 A1 * 2/2008 Sone .................... F02M 37/103 348/674
2011/0146627 A1 * 6/2011 Oohashi ............. F02M 37/0058 123/497
2011/0168134 A1 * 7/2011 Lim ..................... F02M 37/103 123/509
2012/0222655 A1 * 9/2012 Powell ................. F02M 37/103 248/674
2012/0247431 A1 * 10/2012 Powell ................. F02M 37/106 137/565.17
2013/0133765 A1 * 5/2013 Israelson ............... F04D 29/086 137/565.13
2015/0059709 A1 * 3/2015 Oohashi ................. F02M 37/50 123/509
2017/0152823 A1 * 6/2017 McGrew ............ F02M 37/0047

* cited by examiner

*Primary Examiner* — Nicolas A Arnett
(74) *Attorney, Agent, or Firm* — JEEN IP LAW, LLC

(57) ABSTRACT

Disclosed is an anti-siphonage and anti-overflow fuel pump structure. The anti-siphonage and anti-overflow fuel pump structure includes a fuel pump, a fuel inlet hose, a main flow channel assembly, a control box, an exhaust and backflow channel assembly, and a fuel outlet hose, where the control box includes a housing, a battery assembly, and a control board; the main flow channel assembly includes an input channel, an output channel, an exhaust port, and a seal port; and the exhaust and backflow channel assembly includes an exhaust valve, a pipeline joint, an exhaust pipe, and an exhaust and backflow channel, the exhaust valve is arranged inside the exhaust port, the pipeline joint is arranged above the exhaust valve, one end of the exhaust pipe is connected to the pipeline joint, and the other end of the exhaust pipe is connected to the exhaust and backflow channel.

8 Claims, 4 Drawing Sheets

ANTI-SIPHONAGE AND ANTI-OVERFLOW FUEL PUMP STRUCTURE

CROSS-REFERENCE TO RELATED APPLICATIONS

This application claims priority to Chinese Patent Application No. 202520876787.1, filed on May 6, 2025, which is hereby incorporated by reference in its entirety.

TECHNICAL FIELD

The present disclosure relates to the technical field of fuel pumps, and particularly relates to an anti-siphonage and anti-overflow fuel pump structure.

BACKGROUND

A fuel pump is mainly used for pumping gasoline or diesel from a fuel can to a vehicle, a ship, or a mechanical fuel-fired apparatus for its operation. The fuel pump can also pump fuel from a fuel tank of the mechanical apparatus, so an operator can conveniently maintain and overhaul the mechanical apparatus. A portable fuel pump is applied to various scenarios in a broad range.

A flow channel structure of an existing portable fuel pump on the current market is generally integrated with a pump housing. The structure of parts is complex, leading to complex production and assembly processes and inconvenient operation. Moreover, a ventilation valve is arranged at the flow channel of the existing portable fuel pump. The structure is complex and requirements for precision of the parts are high, so fuel leakage and siphonage will occur.

An exhaust structure of the existing fuel pump is equipped with a one-way exhaust valve which risks seal failure. An exhaust channel is in communication with a liquid pressure flow channel. Once the exhaust valve fails, liquid will directly enter a controller through the exhaust channel and even flows to the external environment, and pollute and damage internal control components and the environment, causing control failure and environmental pollution. Accordingly, the product cannot work anymore. In addition, when a fuel outlet is lower than a fuel surface, even if the fuel pump stops working, fuel will still flow out through the fuel outlet under the action of gravity.

SUMMARY

The present disclosure provides an anti-siphonage and anti-overflow fuel pump structure. A double-channel coupling design structure is used, and an exhaust outlet is led to an outlet of a fuel can such that leaked fuel can flow back into the fuel can.

In order to achieve the above objective, the present disclosure provides an anti-siphonage and anti-overflow fuel pump structure. The anti-siphonage and anti-overflow fuel pump structure includes a fuel pump, a fuel inlet hose, a main flow channel assembly, a control box, an exhaust and backflow channel assembly, and a fuel outlet hose. The control box includes a housing, a battery assembly, and a control board. The main flow channel assembly is arranged below the housing and is in communication with an interior of the housing. The main flow channel assembly includes an input channel, an output channel, an exhaust port, and a seal port. One end of the fuel inlet hose is connected to the fuel pump through a first connection kit, and the other end of the fuel inlet hose is connected to the input channel through a second connection kit. The fuel outlet hose is connected to the output channel through a third connection kit. The exhaust and backflow channel assembly is arranged inside the housing and located below the control board. The exhaust and backflow channel assembly includes an exhaust valve, a pipeline joint, an exhaust pipe, and an exhaust and backflow channel. The exhaust valve is arranged inside the exhaust port. The pipeline joint is arranged above the exhaust valve. One end of the exhaust pipe is connected to the pipeline joint, and the other end of the exhaust pipe is connected to the exhaust and backflow channel. The exhaust and backflow channel arranged under the housing.

Further, the battery assembly includes a battery cover, a battery, and an upper housing. The upper housing covers an upper portion of the interior of the housing. The battery is arranged inside the upper housing. The battery cover covers an upper portion of the battery to form a battery accommodating bin together with the upper housing.

Further, the control board is arranged inside another side of the upper housing and electrically connected to the battery.

Further, one end of the exhaust and backflow channel is located inside the bottom end of the housing and connected to the exhaust pipe, and the other end of the exhaust and backflow channel is located outside the bottom end of the housing and connected to an opening of a fuel can.

Further, a seal plug sleeve is arranged inside the seal port, and the seal plug sleeve is arranged inside the housing.

Further, each of the first connection kit, the second connection kit, and the third connection kit is composed of a connection sleeve, a sleeve pipe, and a seal ring.

Further, a nut connector is arranged at an exterior of the second connection kit in a sleeve manner and used for being fixedly connected to an opening of a fuel can.

Further, the exhaust valve is a one-way soft rubber exhaust valve.

An anti-siphonage and anti-overflow fuel pump structure provided in the present disclosure has the beneficial effects as follows:

According to the present disclosure, a double-channel coupling design structure is used, a dynamic pressure balance cavity is formed inside a main flow channel, and an exhaust outlet is led to an outlet of a fuel can. In a fuel pumping process, leaked fuel can flow back into the fuel can through dynamic compensation, such that fuel leakage and siphonage of the fuel pump are effectively relieved.

BRIEF DESCRIPTION OF THE DRAWINGS

Accompanying drawings serve as a constituent part of the present disclosure to provide a further understanding of the present disclosure, such that other features, objectives, and advantages of the present disclosure become clearer. The accompanying drawings of illustrative examples of the present disclosure and their descriptions are used for explaining the present disclosure, but are not intended to unduly limit the present disclosure. In the accompanying drawings.

Figure 1:
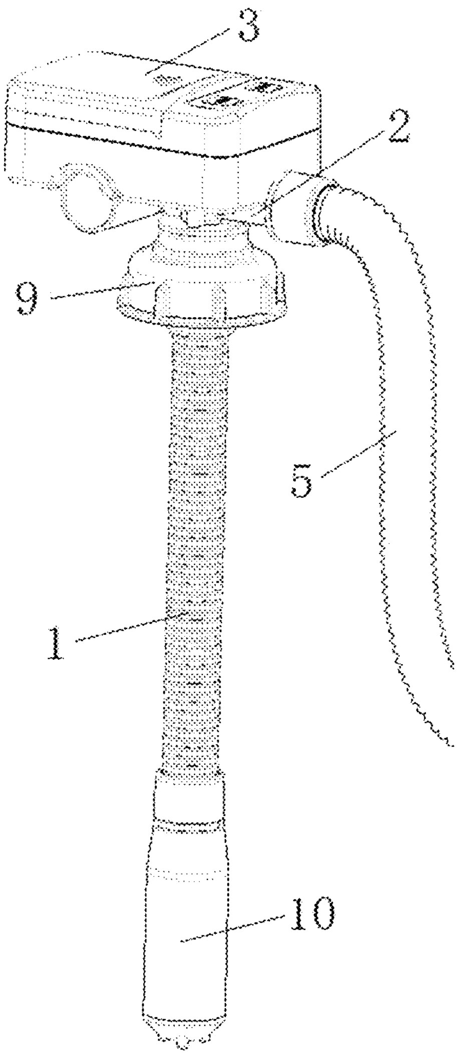
FIG. 1 is a schematic diagram of an anti-siphonage and anti-overflow fuel pump structure according to an example of the present disclosure.

In the figures: 1—fuel inlet hose, 2—main flow channel assembly, 21—input channel, 22—output channel, 23—exhaust port, 24—seal port, 241—seal plug sleeve, 3—control box, 31—housing, 32—battery assembly, 321—battery cover, 322—battery, 323—upper housing, 33—control board, 4—exhaust and backflow channel assembly, 41—exhaust valve, 42—pipeline joint, 43—exhaust pipe, 44—exhaust and backflow channel, 5—fuel outlet hose, 6—connection sleeve, 7—sleeve pipe, 8—seal ring, 9—nut connector, and 10—fuel pump.

DESCRIPTION OF EMBODIMENTS

In order to enable a person skilled in the art to better understand the solutions of the present disclosure, the technical solutions of examples of the present disclosure will be described clearly and comprehensively below in combination with accompanying drawings of the examples of the present disclosure. Clearly, the examples described are merely some examples of the present disclosure, rather than all examples of the present disclosure. Based on the examples of the present disclosure, all other examples derived by a person of ordinary skill in the art without making creative efforts should fall within the scope of protection of the present disclosure.

It should be noted that the terms “first”, “second”, etc. in the description and claims of the present disclosure and in the above accompanying drawings are used for distinguishing between similar objects and not certainly used for describing particular order or sequential order. It should be understood that data used in this way can be interchanged where appropriate such that examples of the present disclosure can be conveniently described herein. In addition, the terms “comprise”, “include”, “have” and their variations are intended to cover non-exclusive inclusion. For instance, a process, method, system, product, or apparatus, which includes a series of steps or units, is not required to be limited by those explicitly listed, but can include other steps or units not explicitly listed or inherent to the process, method, product, or apparatus.

In the present disclosure, the terms “upper”, “lower”, “left”, “right”, “front”, “rear”, “top”, “bottom”, “internal”, “external”, “middle”, “vertical”, “horizontal”, “transverse”, “longitudinal”, etc. indicate orientational or positional relationships based on those shown in the accompanying drawings. These terms are mainly used for better describing the present disclosure and the examples, and are not used for limiting that the indicated device, element, or component must have a particular orientation or be constructed and operated in a particular orientation.

Moreover, some of the above terms may be used for indicating other meanings besides orientational or positional relationships. For instance, the term “upper” may be used for indicating a dependence or connection relationship in some cases. A person of ordinary skill in the art can understand the specific meanings of these terms in the present disclosure according to specific cases.

In addition, the term “plurality of” shall mean two or more.

It should be noted that examples in the present disclosure and features in the examples may be combined with one another without conflicts. The present disclosure will be described in detail below with reference to accompanying drawings and in combination with examples.

Figure 2:
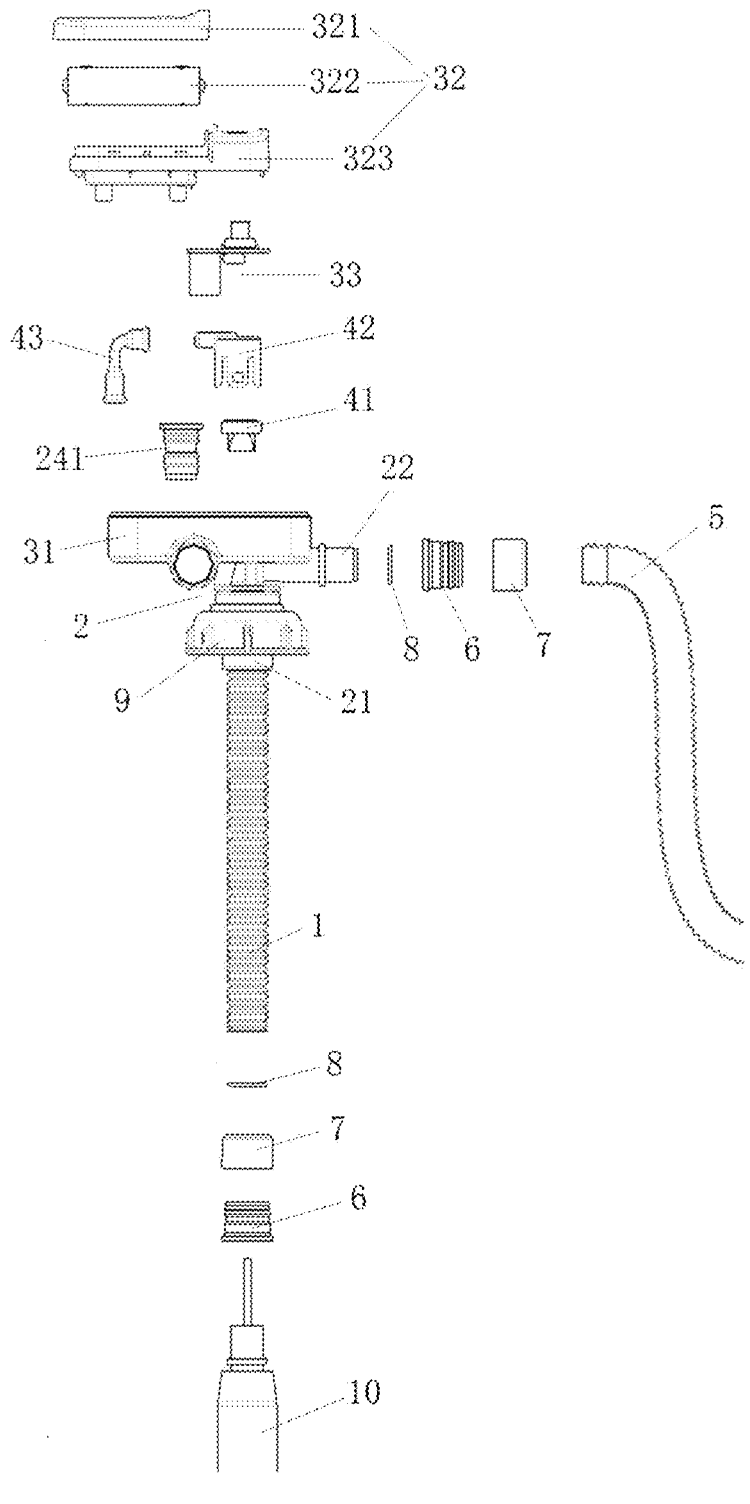
FIG. 2 is an exploded view of an interior of an anti-siphonage and anti-overflow fuel pump structure according to an example of the present disclosure.
Figure 3:
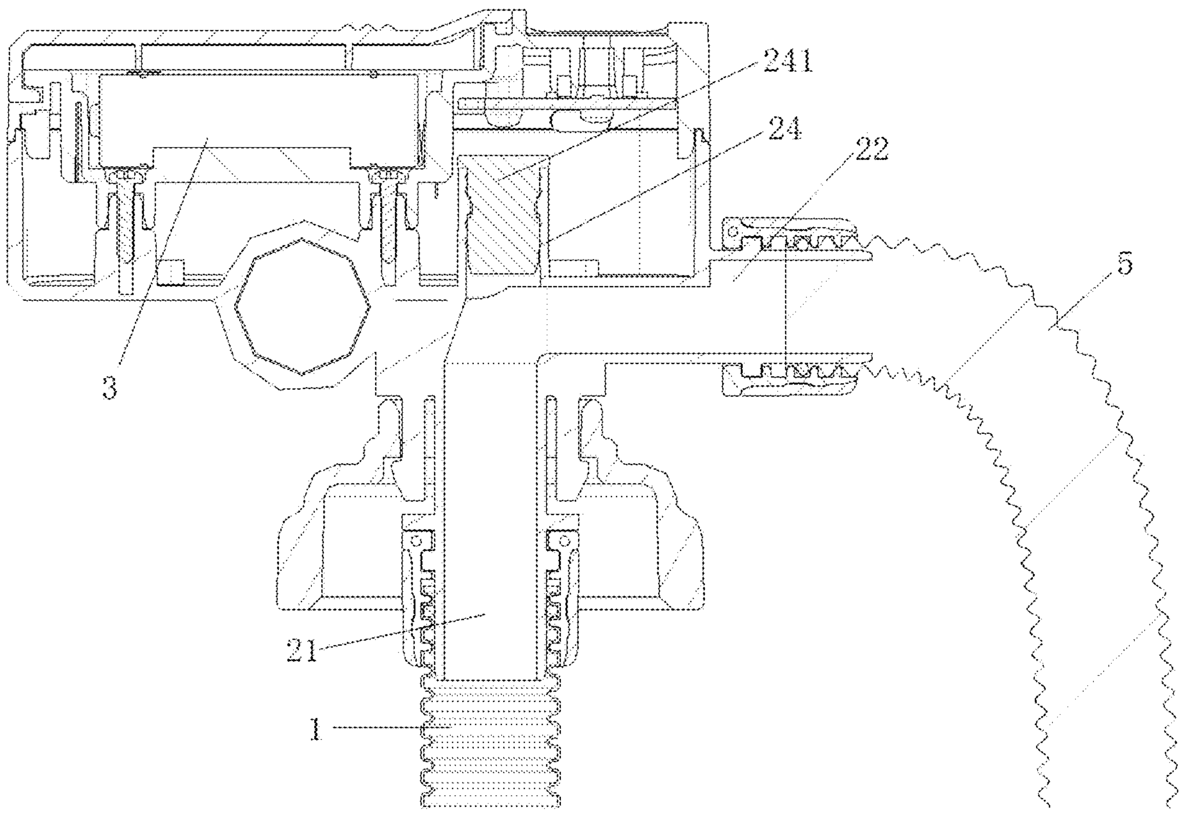
FIG. 3 is a sectional view of a main flow channel of an anti-siphonage and anti-overflow fuel pump structure according to an example of the present disclosure.
Figure 4:
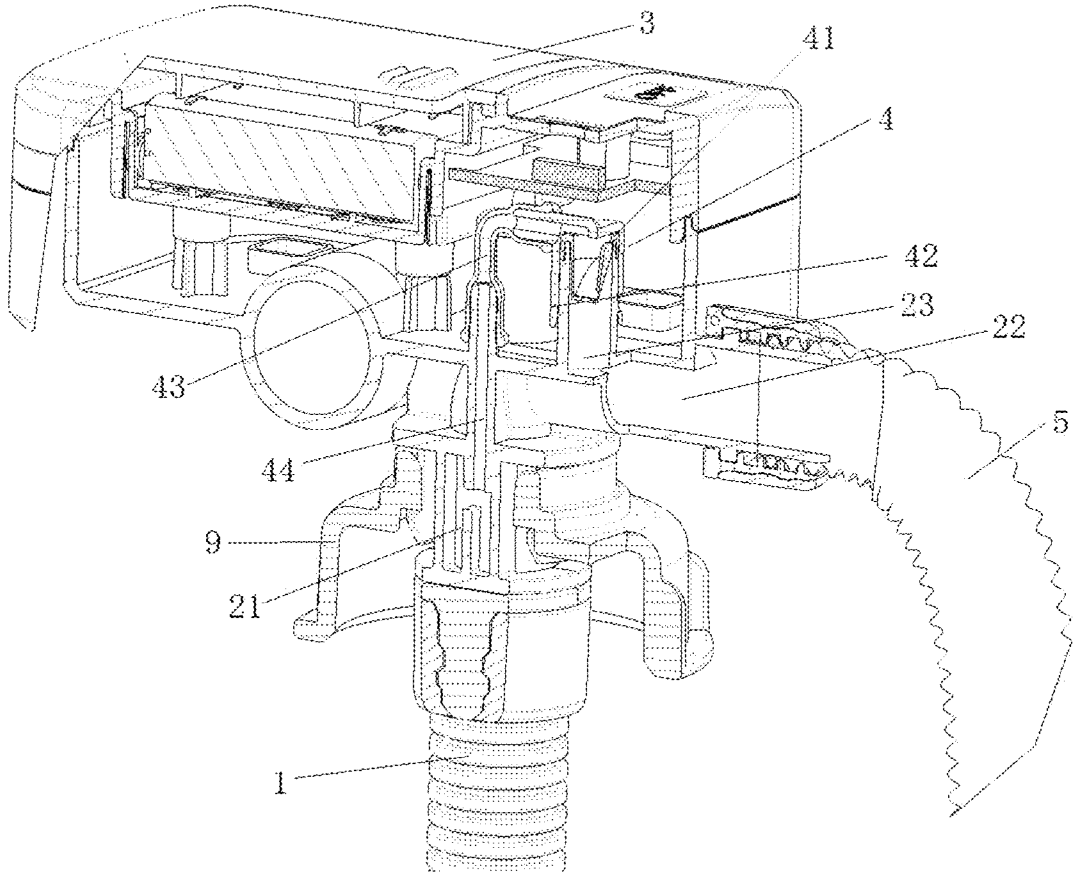
FIG. 4 is a sectional view of an exhaust and backflow channel of an anti-siphonage and anti-overflow fuel pump structure according to an example of the present disclosure.

As shown in FIG. 1-FIG. 4, the present disclosure provides an anti-siphonage and anti-overflow fuel pump structure. The anti-siphonage and anti-overflow fuel pump structure includes a fuel pump 10, a fuel inlet hose 1, a main flow channel assembly 2, a control box 3, an exhaust and backflow channel assembly 4, and a fuel outlet hose 5. The control box 3 includes a housing 31, a battery assembly 32, and a control plate 33. The main flow channel assembly 2 is arranged below the housing 31 and is in communication with an interior of the housing 31. The main flow channel assembly 2 includes an input channel 21, an output channel 22, an exhaust port 23, and a seal port 24. One end of the fuel inlet hose 1 is connected to the fuel pump 10 through a first connection kit, and the other end of the fuel inlet hose is connected to the input channel 21 through a second connection kit. The fuel outlet hose 5 is connected to the output channel 22 through a third connection kit. The exhaust and backflow channel assembly 4 is arranged inside the housing 31 and located below the control board 33. The exhaust and backflow channel assembly 4 includes an exhaust valve 41, a pipeline joint 42, an exhaust pipe 43, and an exhaust and backflow channel 44. The exhaust valve 41 is arranged inside the exhaust port 23. The pipeline joint 42 is arranged above the exhaust valve 41. One end of the exhaust pipe 43 is connected to the pipeline joint 42, and the other end of the exhaust pipe is connected to the exhaust and backflow channel 44. The exhaust and backflow channel 44 arranged under the housing 31.

Specifically, the anti-siphonage and anti-overflow fuel pump structure provided in an example of the present disclosure is mainly used for pumping gasoline or diesel from an interior of a fuel can or a fuel tank. The fuel pump 10 and the fuel inlet hose 1 are inserted into the fuel can, the fuel inlet hose 1 is connected to the fuel pump 10 through the first connection kit, and the fuel pump 10 is located below a fuel surface inside the fuel can. The main flow channel assembly 2 is equivalent to a three-way structure assembly and integrally embedded in the housing 31 below the control box 3. The input channel 21 is arranged below the housing 31 and connected to the fuel inlet hose 1 through the second connection kit. The output channel 22 is arranged on a side of the housing 31 and connected to the fuel outlet hose 5 through the third connection kit. The exhaust port 23 and the seal port 24 extend to the interior of the housing 31. The exhaust port 23 is used for being in butt-joint with the exhaust and backflow channel assembly 4 to discharge gas and enable fuel to flow back. The seal port 24 is used for adjusting pressure inside the channel and radiating heat. The exhaust and backflow channel assembly 4 includes the exhaust valve 41, the pipeline joint 42, the exhaust pipe 43, and the exhaust and backflow channel 44. The exhaust valve 41 is arranged inside the exhaust port 23. The pipeline joint 42 is arranged above the exhaust valve 41. One end of the exhaust pipe 43 is connected to the pipeline joint 42, and the other end of the exhaust pipe is connected to the exhaust and backflow channel 44. The exhaust and backflow channel 44 arranged under the housing 31. The control box 3 plays a role of power supply and control. During fuel pumping, the fuel pump 10 is started through the control box 3. Fuel in the fuel can flows in the main flow channel assembly 2, that is, enters the input channel 21 along the fuel inlet hose 1, and then flows out through the output channel 22 and the fuel outlet hose 5. The fuel outlet hose 5 is subsequently connected to a fuel outlet device such as a fuel gun such that fuel pumping can be implemented. In the fuel pumping process, if seal of the exhaust valve 41 fails, or other phenomena that fuel is left and leaked occur, the fuel left and leaked will enter the exhaust and backflow channel 44 through the exhaust valve 41 and the exhaust pipe 43 and then flow back into the fuel can along the exhaust and backflow channel 44, will not be directly leaked into the control box 3, and thus will not affect a control system and other structures of the fuel pump.

Further, the battery assembly 32 includes a battery cover 321, a battery 322, and an upper housing 323. The upper housing 323 covers an upper portion of the interior of the housing 31. The battery 322 is arranged inside the upper housing 323. The battery cover 321 covers an upper portion of the battery 322 to form a battery accommodating bin together with the upper housing 323. The battery assembly 32 is arranged at an upper half portion of the control box 3, and mainly used for accommodating the battery 322 and supplying power to various external structures. A battery accommodating bin is formed above the housing 31 and used for accommodating the battery 322. A charging structure may be arranged according to actual situations and is used for charging the battery 322.

Further, the control board 33 is arranged inside another side of the upper housing 323 and electrically connected to the battery 322. The control board 33 is arranged on one side of the battery 322 accommodating bin. A control button is arranged on the control board and used for turning on or off the fuel pump 10 to control a working state of the fuel pump 10.

Further, one end of the exhaust and backflow channel 44 is located inside the bottom end of the housing 31 and connected to the exhaust pipe 43, and the other end of the exhaust and backflow channel is located outside the bottom end of the housing 31 and connected to an opening of the fuel can. The exhaust and backflow channel 44 is mainly used for being connected to the fuel can such that the leaked fuel can flow back into the fuel can. The exhaust and backflow channel 44 is integrally fixed to the bottom end of the housing 31. According to actual situations, the exhaust and backflow channel and the housing 31 may be integrally formed, and a lower end of the exhaust and backflow channel is directly connected to the opening of the fuel can. Or a hole may be provided at the bottom end of the housing 31, an upper end of the exhaust and backflow channel 44 is inserted into the housing 31 and fixed, and a lower end of the exhaust and backflow channel extends to an exterior of the housing 31 and is connected to the opening of the fuel can. When the exhaust valve 41 fails or fuel in the main flow channel is leaked, the leaked fuel will enter the exhaust and backflow channel 44 through the exhaust valve 41, the pipeline joint 42, and the exhaust pipe 43 in sequence, and flow back into the fuel can through the exhaust and backflow channel 44. Thus, the leaked fuel can be prevented from affecting operation of the control system.

Further, a seal plug sleeve 241 is arranged inside the seal port 24, and the seal plug sleeve 241 is arranged inside the housing 31. The seal plug sleeve 241 is mainly used for adjusting airflow at the seal port 24 to maintain balance of pressure inside and outside the main flow channel and prevent breakdown or failure of the seal assembly caused by a pressure difference. Moreover, the seal plug sleeve can dissipate heat to prevent breakdown of the apparatus caused by flowing and overheating of the fuel.

Further, each of the first connection kit, the second connection kit, and the third connection kit is composed of a connection sleeve 6, a sleeve pipe 7, and a seal ring 8. The first connection kit and the second connection kit are used for connections of two ends of the fuel inlet hose 1. The third connection kit is used for a connection of the fuel outlet hose 5. A connection structure including a connection sleeve 6, a sleeve pipe 7 and a seal ring 8 is used for the connection kit, such that a connection between the fuel inlet hose 1/the fuel outlet hose 5 and the channel is more stable, and fuel leakage is prevented.

Further, a nut connector 9 is arranged at an exterior of the second connection kit in a sleeve manner and used for being fixedly connected to an opening of a fuel can. The nut connector 9 is arranged at a joint among the input channel 21, the exhaust and backflow channel 44, and the opening of the fuel can. The nut connector 9 is used for being in butt-joint with the fuel can. Threads are arranged at the opening of the fuel can. The input channel 21 and the exhaust and backflow channel 44 are integrally screwed and fixed to the opening of the fuel can through the nut connector 9. In this way, the fuel inlet hose 1 and the fuel pump 10 can be stably inserted into the fuel can, and leaked fuel from the exhaust and backflow channel 44 in the input channel 21 can flow back to the fuel can. Thus, stability and reliability of the fuel pumping process can be ensured.

Further, the exhaust valve 41 is a one-way soft rubber exhaust valve. When the fuel pump 10 stops working, the fuel in the main flow channel will generate negative pressure due to gravity. At this time, atmospheric pressure outside the exhaust valve 41 will be greater than negative pressure inside the exhaust valve, and the exhaust valve 41 will be turned on to allow gas to enter the flow channel such that siphonage of the flow channel can be avoided. When the fuel pump 10 starts working, due to the pressure in the main flow channel, liquid pressure inside the exhaust valve 41 will be greater than atmospheric pressure outside the exhaust valve, such that the exhaust valve 41 will be turned off, and fuel can be prevented from being leaked to the outside. Even if the exhaust valve 41 fails and fuel is leaked, the leaked fuel will flow back to the fuel can through the exhaust valve 41, the exhaust pipe 43, and the exhaust and backflow channel 44 without affecting the entire fuel pump 10. The exhaust valve 41 is preferably a one-way soft rubber valve normally turned off, and can be turned on only when pressure in the flow channel is lower than external atmospheric pressure. Thus, the exhaust valve has excellent pressure resistance and long service life, and is less prone to corrosion failure. By arranging the exhaust and backflow channel assembly 4, leaked fuel or left fuel can flow back into the fuel can, and siphonage of the fuel pump and fuel leakage are resolved.

The above examples are merely preferred examples of the present disclosure, and are not used for limiting the present disclosure. A person skilled in the art can make various modifications and changes on the present disclosure. Any modifications, equivalent substitutions, improvements, etc. within the spirit and principles of the present disclosure should fall within the scope of protection of the present disclosure.

What is claimed is:

1. An anti-siphonage and anti-overflow fuel pump structure, comprising a fuel pump, a fuel inlet hose, a main flow channel assembly, a control box, an exhaust and backflow channel assembly, and a fuel outlet hose, wherein the control box comprises a housing, a battery assembly, and a control board;

the main flow channel assembly is arranged below the housing and is in communication with an interior of the housing;

the main flow channel assembly comprises an input channel, an output channel, an exhaust port, and a seal port;

one end of the fuel inlet hose is connected to the fuel pump through a first connection kit, and the other end of the fuel inlet hose is connected to the input channel through a second connection kit;

the fuel outlet hose is connected to the output channel through a third connection kit;

the exhaust and backflow channel assembly is arranged inside the housing and located below the control board; and the exhaust and backflow channel assembly comprises an exhaust valve, a pipeline joint, an exhaust pipe, and an exhaust and backflow channel, the exhaust valve is arranged inside the exhaust port, the pipeline joint is arranged above the exhaust valve, one end of the exhaust pipe is connected to the pipeline joint, the other end of the exhaust pipe is connected to the exhaust and backflow channel, and the exhaust and backflow channel arranged under the housing.

2. The anti-siphonage and anti-overflow fuel pump structure according to claim 1, wherein the battery assembly comprises a battery cover, a battery, and an upper housing, the upper housing covers an upper portion of the interior of the housing;

the battery is arranged inside the upper housing; and the battery cover covers an upper portion of the battery to form a battery accommodating bin together with the upper housing.

3. The anti-siphonage and anti-overflow fuel pump structure according to claim 2, wherein the control board is arranged inside another side of the upper housing and electrically connected to the battery.

4. The anti-siphonage and anti-overflow fuel pump structure according to claim 3, wherein one end of the exhaust and backflow channel is located inside the bottom end of the housing and connected to the exhaust pipe, and the other end of the exhaust and backflow channel is located outside the bottom end of the housing and connected to an opening of a fuel can.

5. The anti-siphonage and anti-overflow fuel pump structure according to claim 4, wherein a seal plug sleeve is arranged inside the seal port, and the seal plug sleeve is arranged inside the housing.

6. The anti-siphonage and anti-overflow fuel pump structure according to claim 5, wherein each of the first connection kit, the second connection kit, and the third connection kit is composed of a connection sleeve, a sleeve pipe, and a seal ring.

7. The anti-siphonage and anti-overflow fuel pump structure according to claim 6, wherein a nut connector is arranged at an exterior of the second connection kit in a sleeve manner and used for being fixedly connected to an opening of a fuel can.

8. The anti-siphonage and anti-overflow fuel pump structure according to claim 7, wherein the exhaust valve is a one-way soft rubber exhaust valve.

* * * * *